United States Patent [19]
Roberts

[11] Patent Number: 4,890,416
[45] Date of Patent: * Jan. 2, 1990

[54] TRAP-GUARD FOR VERMIN REPELLANT DESTRUCTION

[76] Inventor: Ernest H. Roberts, 2200 N. Ridge Rd. East, Elyria, Ohio 44036

[*] Notice: The portion of the term of this patent subsequent to Nov. 8, 2005 has been disclaimed.

[21] Appl. No.: 264,191

[22] Filed: Nov. 1, 1988

Related U.S. Application Data

[63] Continuation-in-part of Ser. No. 123,310, Nov. 20, 1987, Pat. No. 4,782,622.

[51] Int. Cl.4 ............................................. A01M 25/00
[52] U.S. Cl. .................................. 43/131; 114/221 R
[58] Field of Search ...................... 43/131; 114/221 R

[56] References Cited

U.S. PATENT DOCUMENTS

| | | | |
|---|---|---|---|
| 1,005,530 | 10/1911 | Fritsch | 43/131 |
| 1,052,547 | 2/1913 | Worthington | 114/221 |
| 1,060,993 | 5/1913 | Maynard | 114/221 |
| 1,401,540 | 12/1921 | Konig | 114/221 |
| 1,474,597 | 4/1921 | Carey | 114/221 |
| 1,486,417 | 3/1924 | Cheely | 114/221 |
| 1,611,515 | 12/1926 | Crown | 43/131 |
| 1,769,408 | 7/1930 | Andrews | 43/131 |
| 1,850,763 | 3/1932 | Morley | 43/107 |
| 2,233,832 | 3/1941 | Byrd | 43/107 |
| 2,325,616 | 8/1943 | Landweber | 114/235 |
| 2,525,234 | 10/1950 | Mucke | 114/221 |
| 2,617,378 | 11/1952 | Osol | 114/221 |
| 3,005,436 | 10/1961 | Caldwell | 114/221 |
| 3,320,692 | 5/1967 | Hellen | 43/65 |

*Primary Examiner*—M. Jordan
*Attorney, Agent, or Firm*—Fay, Sharpe, Beall, Fagan, Minnich & McKee

[57] ABSTRACT

A barrier against vermin crawling along an elongated structure. The barrier comprises an outer shell having a generally continuous side wall and an end wall which together define a cavity. A mounting means connects the outer shell to the elongated structure, and a pesticide is disposed inside the cavity for providing a vermin-deterring environment therein.

18 Claims, 4 Drawing Sheets

TRAP-GUARD FOR VERMIN REPELLANT DESTRUCTION

This application is a continuation-in-part of application Ser. No. 123,310, filed Nov. 20, 1987, now U.S. Pat. No. 4,782,622.

BACKGROUND OF THE INVENTION

The present invention relates to a trap-guard or barrier for use on lines extending up from near ground to secure or connect to an object above ground or on water. The invention was made to provide a trap-guard with a deformable but unitary body structure selectively attachable along lines, ropes, hawsers, etc. The purpose of the invention is to repel or destroy vermin such as rodents, insects and spiders which use an available extended line to climb up and onto a movable object such as a boat on water or tarpaulin-covered vehicle, etc., on land. Another purpose of the invention is to repel or destroy vermin such as rodents, insects and spiders that crawl along many other elongated objects including table legs, sapling trees, and posts in order to travel from one point on the elongated structure to another. The improved trap-guard or barrier is a composite structure precision molded from state of the art plastic compounds so as to have a long useful life.

The scope and content of the prior art has been determined as explained below.

U.S. Pat. No. 1,052,547, February, 1913, Worthington, discloses a rat trap for use on ships' hawsers. A trap has a rat or mouse proof receptacle mounted between a pair of identical disks. The disks are each divided into two parts 1 and 2 and each is hinged together at 3. The disks are each braced together by stays 4 and a covering piece 5 is inserted between each semidisk 1 for protection of the hawser 6. A rat proof wired enclosure 7 has an aperture 8, rat race 9, and hinged drop door 10 at each end. Stops 11 on door 10 allowed opening to a predetermined point. Another door 12 for emptying purposes is formed in the side of the trap 7. A trap fixed in position on the hawser 6 is held firmly in place by a coiled spring 13 having a hook end 14 and a free end connected to a stay 4.

U.S. Pat. No. 1,060,993, May 1913, Maynard (filed before Worthington), provides a trap-guard with a "means whereby the entrapped animal is smeared with a poisonous material." Maynard has a wire trap 2 between identical disks 3, hinged at with longitudinal internal brace bars 5 having grip members 6 thereon for enclosing a mooring hawser 22. The poison pad 26 extends longitudinally through the trap between end disks 3.

U.S. Pat. No. 1,373,597, April 1921, Carey, discloses rat guard for ship's ropes comprising a pair of hingedly connected disk sections together forming a flattened cone.

U.S. Pat. No. 1,850,763, March 1932, Morley, discloses a mite trap with a disc plate 16 having a passageway 14 leading to the interior of a receptacle 10.

U.S. Pat. No. 2,233,832, March 1941, Byrd, discloses an insect guard with a coating 5 squeezed firmly against the mounting pipe so as to effect a tight seal.

U.S. Pat. No. 2,617,378, November 1952, Osol, shows a self-adjusting and locking rat guard for mooring lines with hub portions 4 and 5 for snugly surrounding the line 1.

U.S. Pat. No. 3,005,436, October 1961, Caldwell, shows a rat guard for ship hawsers With a resilient member 17 completing a seal around a hawser 28.

The above prior art references are understood to be from a search in Class 114, subclasses 221 and 221 R (including foreign and literature).

Other art of general interest for structural configurations (cone and cylindrical casings) includes: U.S. Pat. No. 1,005,530, October 1911, Fritsch (fly trap); U.S. Pat. No. 1,611,515, December 1926, Crown (fly trap and bug catcher); U.S. Pat. No. 1,769,408, July 1930, Andrews (ant-poison, feeder); and U.S. Pat. No. 3,320,692, May 1967, Hellen (lethal trapping device). These four patents are from a search in Class 43, subclasses 1, 107, 120, 121, 131 and 132.1.

SUMMARY OF THE INVENTION

It is an object of the present invention to provide an improved trap-guard or barrier with a deformable but unitary body structure.

It is further object to provide a trap-guard for retaining and positioning, safely and without undue exposure to humans, toxic chemical compounds active to repel or destroy rodent or insect vermin.

Still further, it is an object to provide trap-guards, with replaceable rodent or insect vermin repelling or destroying chemical properties, which are precision molded from state of the art plastic compounds so as to have a long useful life.

These and other objects of the invention, and further advantages thereof, will be apparent in view of the detailed description and drawings.

In general, the improved trap-guard for use on a line, rope or hawser comprises a body, a central tube and a mounting means for a conventional vermin repellant-destruction chemical compound.

The trap-guard body is formed by mating sections interconnected by a pliable hinge to have a closed periphery. The body mating sections when closed together by fastening means have a closed (upper) end and an open (lower) end.

The trap-guard central tube extends axially through the body and is formed by mating sections interconnected with the closed (upper) ends of the body mating sections. The tube mating sections define when closed together by fastening means a cylindrical inner surface for enclosing the line, rope or hawser or other elongated structure.

The trap-guard mounting means replaceably positions a vermin repellant-destruction chemical compound within the interior of the body and near to or away from the body open end, and away from the central tube.

IN THE DRAWINGS

DETAILED DESCRIPTION OF THE INVENTION

Figure 1:
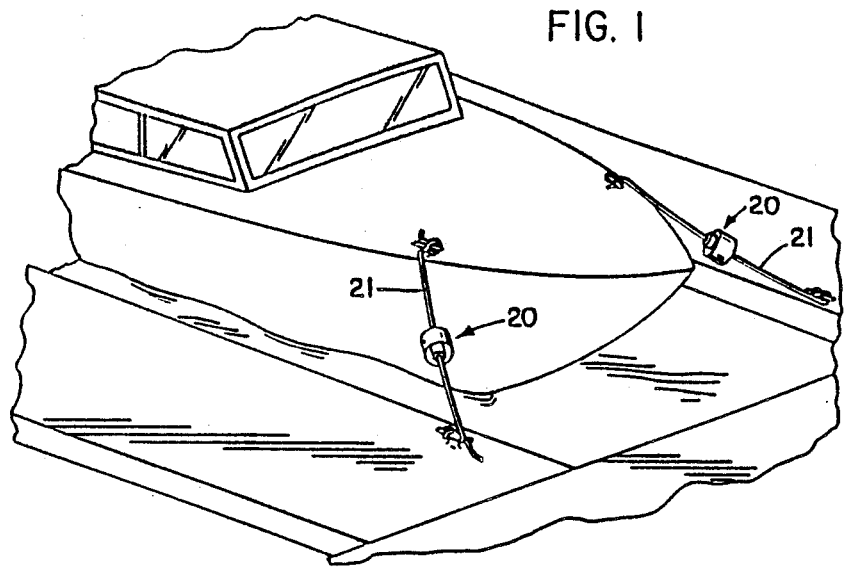
FIG. 1 is a view of two trap-guards according to the invention being used on mooring lines to secure a boat within a mooring slip.
Figure 2:
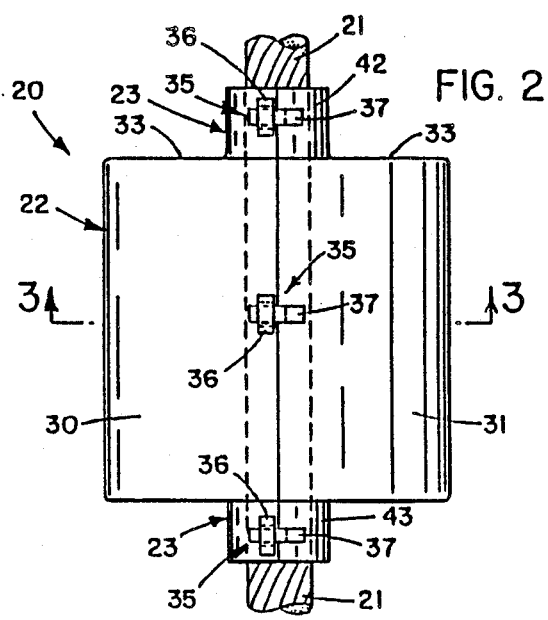
FIG. 2 is a full view of a trap-guard attached to a line, rope or hawser.
Figure 3:
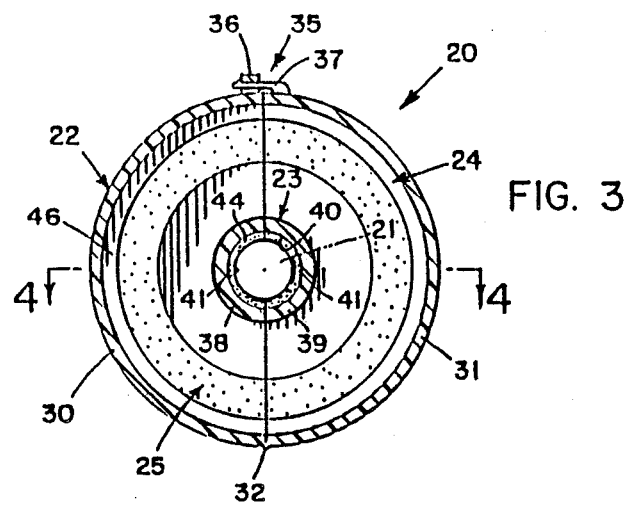
FIG. 3 is a cross-section of a trap-guard taken substantially as indicated on line 3—3 of FIG. 2.
Figure 4:
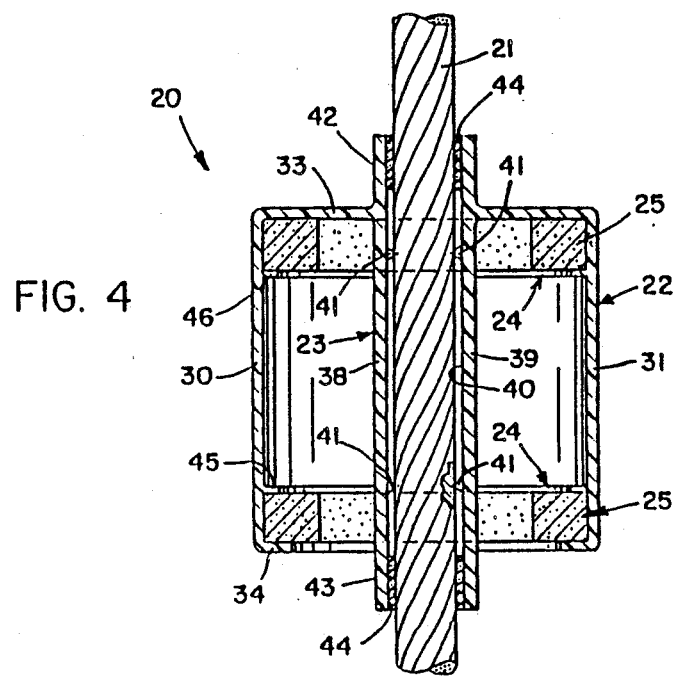
FIG. 4 is a full section of a trap-guard taken substantially as indicated on line 4—4 of FIG. 3.

An improved trap-guard according to the invention is referred to generally by the numeral 20. As shown in the environmental view of FIG. 1, trap-guards 20 may be used dockside on lines, ropes or hawsers indicated at 21 to moor a boat. Trap-guards 20 are versatile and easily applied in any rodent and insect vermin environment wherein a line, rope or hawser extends from ground to an object.

A trap-guard 20 for mounting on a line 21 has a body referred to generally by the numeral 22, a central tube referred to generally by the numeral 23, and a mounting means referred to generally by the numeral 24 for a preformed vermin repellant-destruction chemical compound referred to generally by the numeral 25.

The trap-guard body 22 is formed by mating sections such as a pair of halves 30, 31 interconnected by an integrally formed pliable hinge 32 to have a closed periphery. As shown, the body 22 has a cylindrical periphery, although other closed periphery configurations such as square, polygonal, or pyramidal could be provided therefore.

When closed together, the body mating sections will provide a trap-guard body 22 with an integrally formed closed (upper) end 33 and an open (lower) end surrounded by a retaining flange 34.

The body half sections 30, 31 are closed together around hinge 32 by a fastening means referred to generally by the numeral 35. As shown, each fastening means 35 is an integrally formed interfitting staple 36 and hasp 37 on opposed half sections 30 and 31.

The trap-guard central tube 23 extends axially through the body 22 and is formed by mating sections such as a pair of halves 38, 39 interconnected and integrally formed with a closed (upper) end 33 of a body half section 30 or 31. When closed together by a fastening means 35, the tube halves 38, 39 will define a central tube 23 with a cylindrical inner surface 40 to enclose a line 21. The tube inner surface 40 has gripping means indicated at 41 to releasably engage a line 21. As shown, the line gripping means 41 are a series of integrally formed radially inwardly projecting serrated or conically tapered teeth.

The tube line halves 38, 39 are closed together around a line 21 by fastening means 35. The closed central tube 23 has one end (upper) 42 projecting beyond the body closed end 33 and an opposite (lower) end 43 projecting beyond the retaining flange 34 surrounding the body open (lower) end. The tube fastening means 35 may be an integrally formed interfitting staple 36 and hasp 37 on opposed tube ends 42 and 43.

The cylindrical inner surface 40 may have a predetermined diameter for varied size lines 21. In such an embodiment, a resilient spacer means indicated at 44 may be positioned or inserted with the projecting tube ends 42 and 43. The spacer means 44 will more securely grip or engage a line 21 and also prevent insect vermin from crawling up within the central tube and bypassing the trap formed by the interior of the body 22.

The trap-guard mounting means 24 replaceably positions a vermin repellant-destruction chemical compound 25 within the trap interior of the body 22, near to the body open end and retaining flange 34 and radially away from the central tube 23. An open (lower) end mounting means 24 may be the retaining flange 34 and a spaced-apart retaining ring 45 integrally formed on mating body halves 30 and 31. The flange 34—ring 45 will provide a pocket to receive a preformed donut or ring of chemical compound 25. As shown, there may also be a second closed (upper) end mounting means 24 provided by the closed end 33 and a spaced apart retaining ring 46 integrally formed on the body halves 30 and 31.

Figure 5:
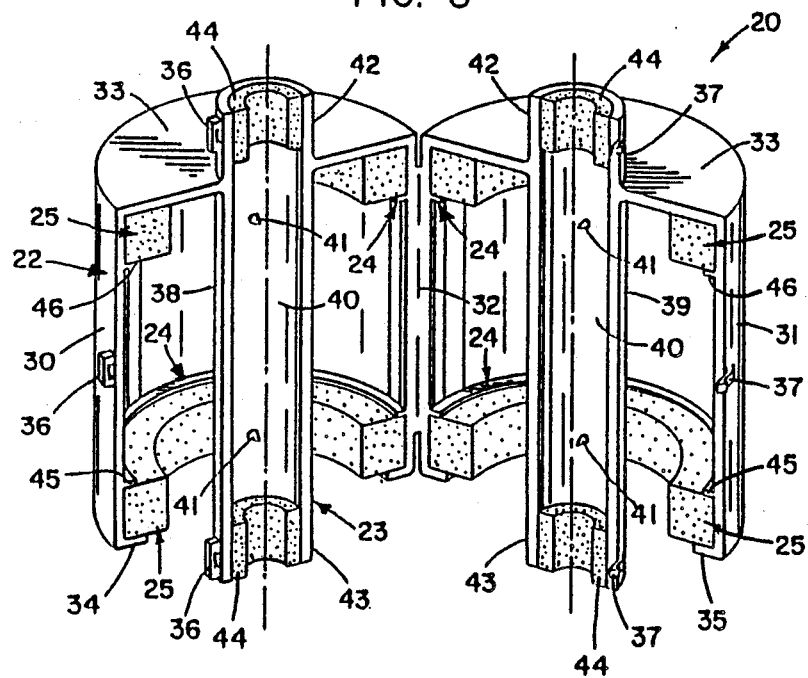
FIG. 5 is an isometric view of an opened trap-guard showing near identical mating halves connected by a pliable hinge.

As shown, the vermin repellant-destruction chemical compound 25 held within the trap-guard body 22 by the retaining rings 45 or 46 may have a conventional or state of the art chemical composition. The chemicals plus additives, fillers or viscous carriers or pastes may be molded per se in a suitable shape. Or, suitably shaped inert carriers may be impregnated with the chemical compounds. Whatever the composition or form of the chemical compound so chosen, the trap-guard 20 may be opened (as shown in FIG. 5) for insert or periodic replacement of the chemical compound 25 in mating sections or halves for engagement by the retaining rings 45 or 46.

Figure 7:
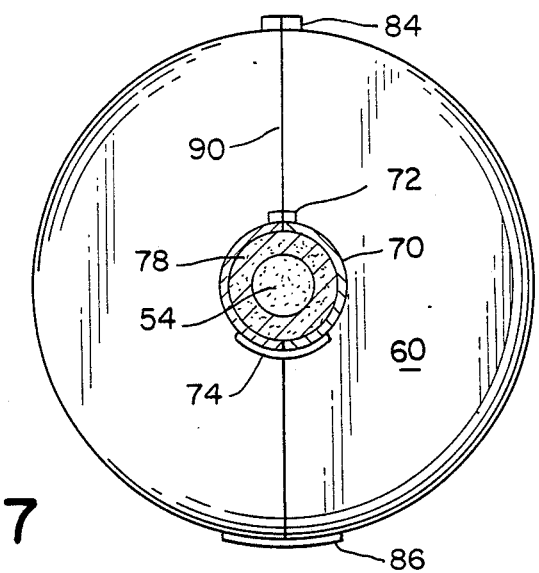
FIG. 7 is a plan view of the barrier of FIG. 6.
Figure 6:
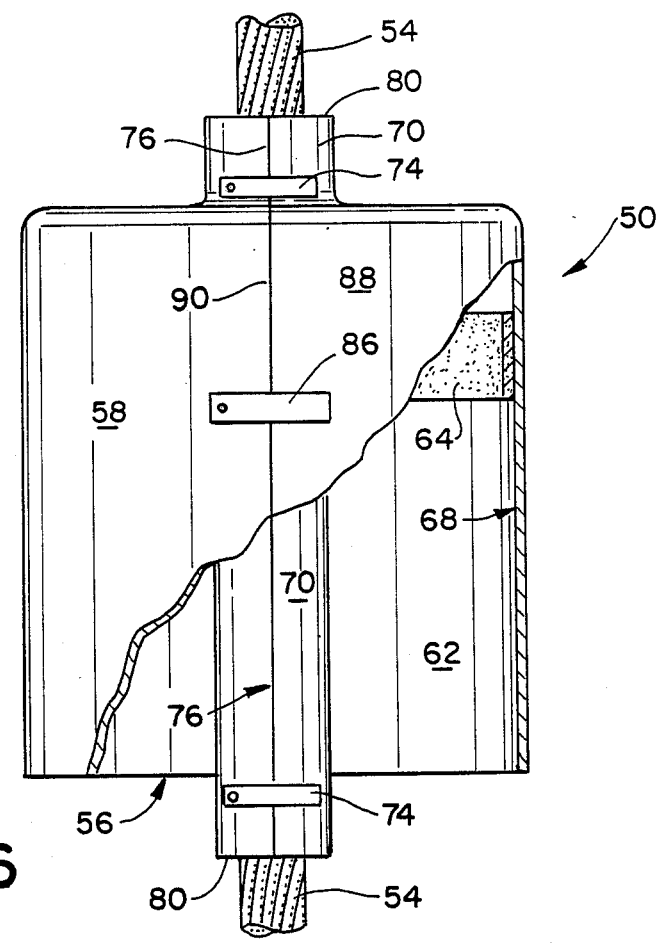
FIG. 6 is an elevational view of a barrier according to another preferred embodiment of the invention, with a portion broken away in cross section.

FIG. 6 shows a second preferred embodiment of the invention. More particularly, FIG. 6 shows generally a barrier 50 against vermin crawling along an elongated structure 54 such as a rope, pole, table leg, sapling, cable, beam, support column, supporting member, angle brace or truss. FIG. 7 shows the elongated structure 54 to be of cylindrical configuration; however, the structure 54 could be of square, oval, pentagonal, or any other configuration which defines an elongated structure. The barrier can be used in a variety of environments such as in association with boat moorings, banquet tables, cables, tree nurseries, or any other such structure along which vermin can crawl.

The barrier 50 includes an outer shell 58 and, as shown in FIG. 7, a fully closed vermin impervious end wall 60. The outer shell 58 defines a barrier free access opening 56 axially opposite the end wall 60.

The outer shell 58 and end wall 60 combine to provide a deep, dark cavity 62 around a portion of the elongated structure 54. Vermin, primarily roaches, are attracted through access opening 56 and into this cavity which provides a harborage, shelter or hiding place for these and other crawling pests which seek out dark areas. A vermin deterring, or more specifically, a vermin-killing environment is achieved within the cavity 62 as a result of a laminarly applied pesticide 64. Insecticide or pesticide 64 is a toxic chemical substance which kills or severely impairs insects, rodents or spiders. It can be applied on an inner surface 68 of barrier 50 in a number of ways. For example, the pesticide can be applied onto an adhesive-backed material, such as tape, which is mounted on the inner surface 68 to cover a sufficient portion of such inner surface. FIG. 6 shows a band of adhesive as it is circumferentially or peripherally applied on and about the inner surface 68. Such a band could be applied at any point along the inner surface of the outer shell. Of course, although not shown, it is possible that patches of pesticide can be placed randomly on inner surface 68. In addition, the pesticide can be applied by spraying it onto the inner surface 68. Alternatively, the pesticide can be applied by placing it directly on the surface, or by painting the surface with a mixture of paint and pesticide.

A tube or mounting means 70 connects the outer shell 58 to the elongated structure 54. The tube 70 extends generally axially through the outer shell and is shown to project axially outward beyond end wall 60 and axis opening 56. Tube 70 need not extend the entire distance as shown in FIG. 6, but could instead extend along only a portion of the axis defined by outer shell 58.

The mounting means or tube 70 is shown to be an elongated cylindrical tube having a hinge 72 and strap-like clamp 74 for holding the tube 70 on or around the elongated structure. FIG. 6 shows the clamp 74 closing over the tube seam 76 through which the elongated structure 54 passes upon mounting the barrier 50 in place. It is possible that the tube be available in a number of relatively movable portions which otherwise snap, clamp or fasten together.

A collar 78 releasably fits between the tube 70 and elongated structure 54, and functions as a means for preventing relative motion between the outer shell 58 and the elongated structure 54. The collar 78 is comprised of polyurethane padding or other pliable, compressible material. Further, the collar 78 can have a variety of configurations, such as elliptical or polygonal, so as to provide a tight fit around a corresponding elongated structure 54. The collar 78 must be located at least at axial ends 80 of tube 70 in order to prevent vermin from crawling between the elongated structure 54 and tube 70.

The outer shell 58 is comprised of relatively movable components which are connected together as one unit that is pliable or hinged, or they are separate portions which fasten together by snaps, clamps, or other fasteners. The portions join together to form a tight seal for preventing relative movement between the portions, and for preventing vermin from escaping the confines of the cavity 62. FIGS. 6 and 7 show a hinge 84 and a strap-like enclosure or clamp or ratchet 86. These figures show an example of a shell that is one piece with separate elements joined together by hinge 84 and ratchet 86. The shell 58 and end wall 60 disclose seam 90 which divides the shell and end wall into at least two relatively movable components, although it is possible to provide more than two of such components. Of course, the outer shell 58 could be available in any number of portions which fit together to surround the elongated structure 54 in a variety of configurations including ellipses and polygons. Such portions would likewise be fastened together to form a continuous side wall using a suitable fastening means.

An outer surface 88 of the shell 58 is comprised of a smooth and slippery layer of polytetrafluoroethylene or other like substance. The purpose of such a slippery surface is to cause any vermin which chance to bypass the vermin-deterring environment inside the cavity to lose their footing and slip away from the barrier 50. The surface acts as a check on the barrier capabilities in connection with the vermin-deterring pesticide in the cavity 62. Another check on the barrier is provided by end wall 60 which is depicted in FIG. 7 as being of disk-like configuration, although other configurations are possible. Any vermin which crawls into the cavity 62 cannot exit the cavity in any direction other than by going back trough the access opening 56. End wall 60 is solid and snugly fits about tube or mounting means 70 to prevent even the slightest of pests from passing through and continuing along the elongated structure.

Although the invention has been shown and described with respect to preferred embodiments, it is obvious that modifications and alterations will occur to others upon reading and understanding of this specification. For example, features and relationships from the embodiments of FIGS. 1–5 may be incorporated into the embodiments of FIGS. 6 and 7, and features and relationships from FIGS. 6 and 7 may be incorporated into the embodiments of FIGS. 1–5. Also, and while the invention has been described with reference to a trap-guard or barrier for use in connection with boats, banquet tables, tree nurseries and cables, it will be readily appreciated that it is also applicable to a variety of other environments which provide elongated structures along which vermin can crawl. It is intended to include all such modifications and alternations insofar as they come within the scope of the claims or the equivalents thereof.

Having thus described the invention, it is now claimed:

1. A barrier against vermin crawling along an elongated structure, the barrier comprising:
   an outer shell having a fully closed vermin impervious end wall and a generally continuous side wall assembly defining a cavity, the continuous side wall further defining a fully open, unobstructed, barrier-free access opening axially opposite the closed end wall, said access opening defined by an end of the generally continuous side wall;
   mounting means for connecting the outer shell to the elongated structure with the elongated structure extending generally axially through said outer shell, said mounting means further including means for preventing relative motion between the outer shell and the elongated structure; and,
   a pesticide disposed in the cavity for creating a vermin-deterring environment inside the cavity.

2. The barrier of claim 1 wherein the outer shell is comprised of relatively movable components.

3. The barrier of claim 2 wherein the relatively movable components are releasably joined together to form the generally continuous side wall.

4. The barrier of claim 3 wherein the relatively movable components are hinged together to form the generally continuous side wall.

5. The barrier of claim 3 wherein the relatively movable components are clamped together to form the generally continuous side wall.

6. The barrier of claim 5 wherein a strap clamps relatively movable components together, the strap reaching at least a portion of the way about the outer shell.

7. The barrier of claim 1 wherein the outer shell side wall is of a generally cylindrical configuration.

8. The barrier of claim 1 wherein the outer shell has a smooth surface.

9. The barrier of claim 8 wherein the smooth surface is comprised of polytetrafluoroethylene.

10. The barrier of claim 1 wherein the mounting means is positioned between the sidewall and the elongated structure.

11. The barrier of claim 10 wherein the mounting means is comprised of a tubular member extending along an axis defined by the outer shell and the elongated structure.

12. The barrier of claim 10 wherein the mounting means is comprised of a radially extending rigid support member.

13. The barrier of claim 12 wherein the mounting means is an impermeable end disk.

14. The barrier of claim 11 wherein a collar is releasably received between the tubular member and the elongated structure whereby the collar can be removed to permit use of a collar having an inner perimeter conforming to the elongated structure, the collar radially extending from the elongated structure to the tubular member and providing a tight fit at an axial end of the tubular member to prevent vermin penetration between the elongated structure and tubular member.

15. The barrier of claim 1 wherein the pesticide is laminarly applied on the side wall.

16. The barrier of claim 15 wherein the pesticide is applied to adhesive backed material which is mountingly affixed on a side wall inner surface.

17. The barrier of claim 15 wherein the pesticide is applied on the side wall by painting.

18. The barrier of claim 15 wherein the pesticide is applied on the side wall by spraying.

* * * * *